US 6,652,106 B2

(12) United States Patent
Sloot

(10) Patent No.: US 6,652,106 B2
(45) Date of Patent: Nov. 25, 2003

(54) BICYCLE SAFETY REFLECTORS

(75) Inventor: Alexander Sloot, Sugarloaf, PA (US)

(73) Assignee: Printmark Industries, Inc., Hazelton, PA (US)

( * ) Notice: Subject to any disclaimer, the term of this patent is extended or adjusted under 35 U.S.C. 154(b) by 55 days.

(21) Appl. No.: 10/103,513

(22) Filed: Mar. 21, 2002

(65) Prior Publication Data

US 2003/0179451 A1 Sep. 25, 2003

(51) Int. Cl.$^7$ .................................................. G02B 5/12
(52) U.S. Cl. ........................ 359/520; 359/515; 359/533; 359/548; 359/842; 359/850
(58) Field of Search ................................. 359/515–523, 359/532–533, 548–550, 552–553, 842, 855, 850

(56) References Cited

U.S. PATENT DOCUMENTS

| 5,923,483 A | 7/1999 | Sloot |
| 6,016,101 A | 1/2000 | Brown |
| 6,273,572 B1 | 8/2001 | Rood |

*Primary Examiner*—James Phan
(74) *Attorney, Agent, or Firm*—St. Onge Steward Johnston & Reens LLC

(57) ABSTRACT

The invention relates to a reflector, including at least one flexible reflective element wrapped around a bicycle member, a backing in contact with an first end of the at least one flexible reflective element along a portion of a periphery of the backing, thereby defining a pocket, and a second end of the at least one flexible reflective element placed in between the backing and the at least one flexible reflective element by cooperation of the a second end being held in place by the pocket.

8 Claims, 4 Drawing Sheets

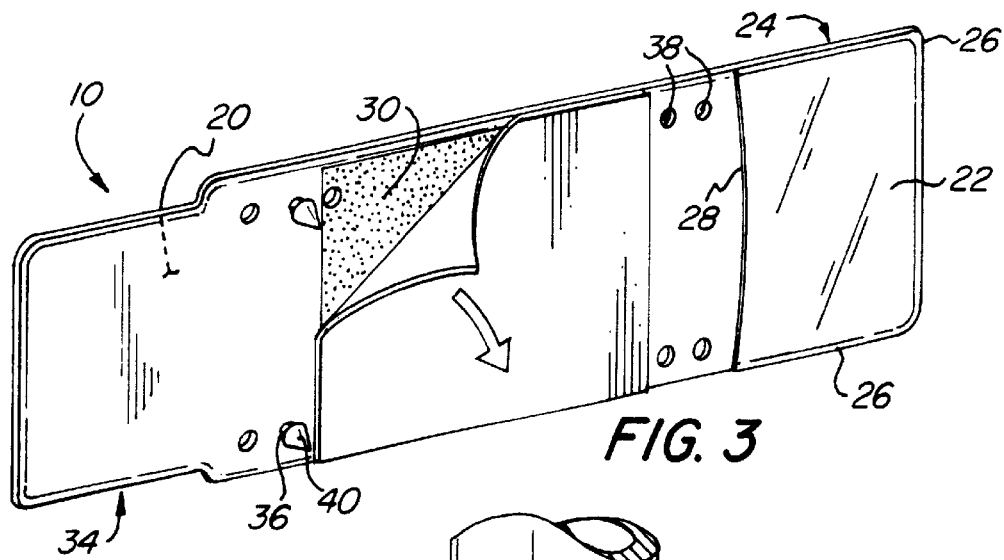
FIG. 3
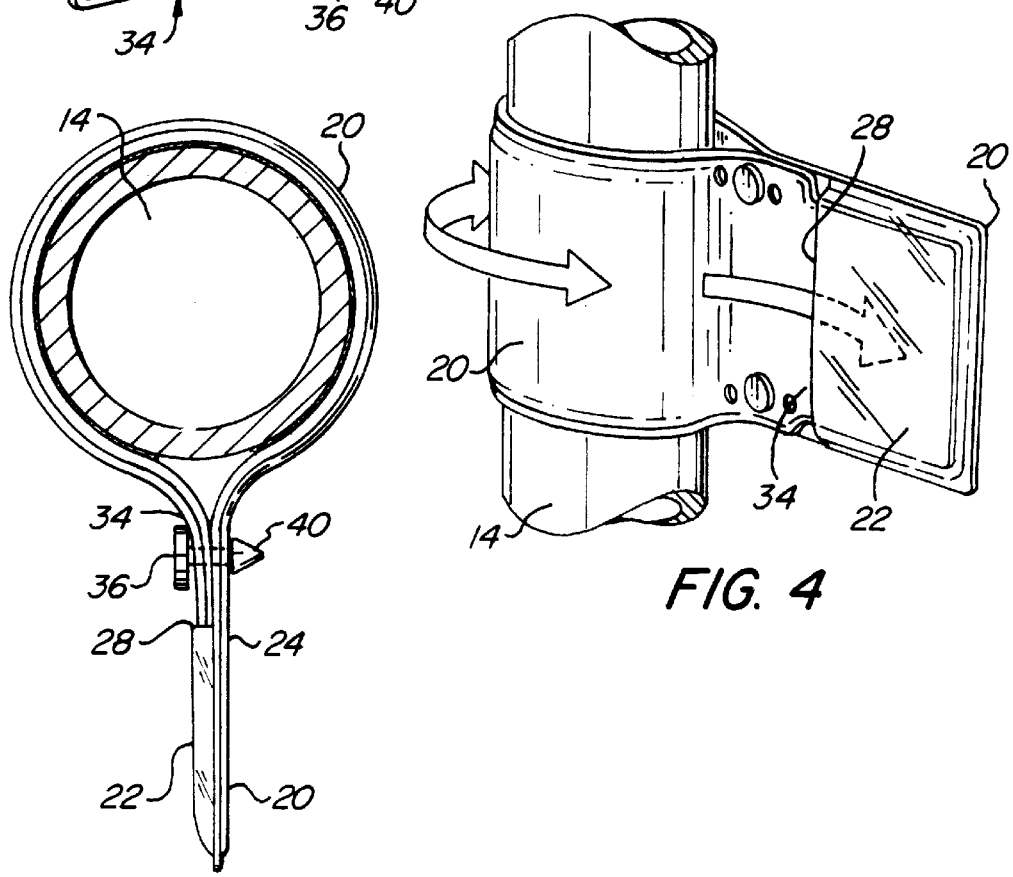
FIG. 4
FIG. 5

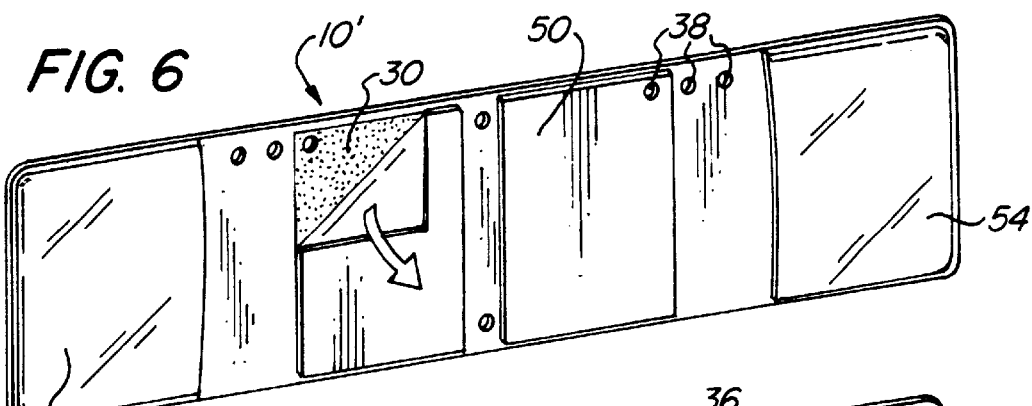
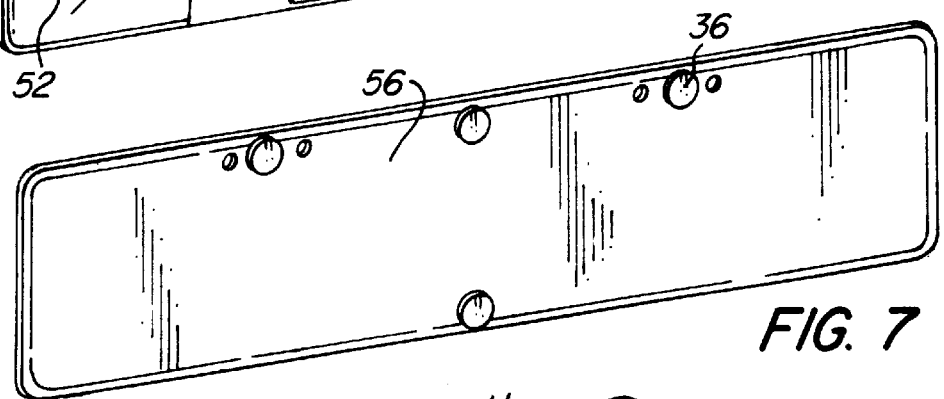
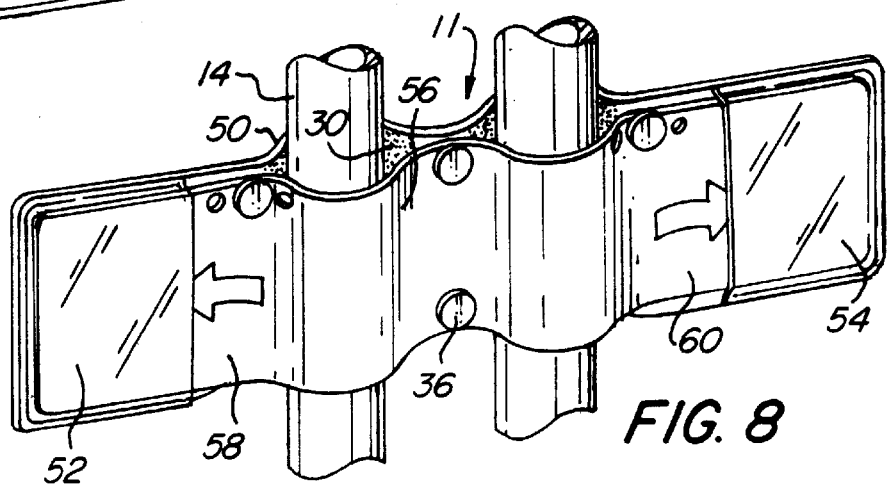
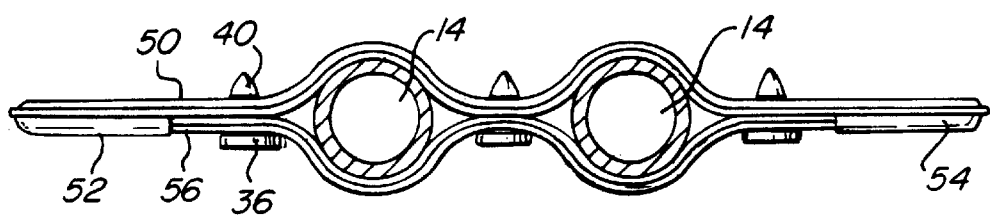

BICYCLE SAFETY REFLECTORS

FIELD OF THE INVENTION

The invention relates to a bicycle reflector that is easily attached to and removed from a bicycle.

BACKGROUND OF THE INVENTION

Wheel attachments are known in the prior art to provide several benefits to both users of the wheel attachments and operators of motor vehicles who are in visual contact with the users. Wheel attachments, such as reflectors, often reflect a motor vehicle's light and, as a result, make the user more visible to motor vehicle drivers. Moreover, this feature typically provides safety benefits to the users.

Reflectors are often used on bicycles but may also be used on motorcycles, wheelchairs, and other vehicles desired to have enhanced visibility. One problem often associated with reflectors is their difficulty mounting the reflectors to the vehicle. Some reflectors are fastened via fasteners such as screws, nuts, bolts, and the like. Fasteners that come loose during normal riding conditions over time may result in the reflectors coming off and becoming lost. Other reflectors snap together about a part of the vehicle, such as spokes, a bicycle's front forks, a bicycle's rear forks, or any part of a vehicle, making removal difficult and often resulting in damage to the reflectors.

U.S. Pat. No. 5,923,483 to Sloot ("Sloot") relates to a reflector typically having holes that accept and hold a wheel spoke. The holes generally secure the reflector to the spoke but may permit the reflector to freely slide up and down and rotate about the spoke. U.S. Pat. No. 6,016,101 to Brown ("Brown") relates to an illuminated bicycle reflector typically having an arc shaped outer portion and an arc shaped inner portion. The outer and inner portions are generally fastened to each other on either side of the wheel spokes via screws, thereby securing the reflector to the spokes. U.S. Patent to Burison ("Burison") generally relates to a bicycle reflector having several reflective members. The reflective members may be attached to a part of the bicycle via bolts, nuts, and washers. Also, attaching reflective members using fasteners, such as bolts, nuts, and washers, can be relatively expensive and complex to operate when compared to other securing mechanisms.

U.S. Pat. No. 6,273,572 to Rood ("Rood") relates to a bicycle reflector which may be mounted on a seat post or a handlebar. The reflector generally includes a collar that typically encompasses the seat post or handlebar and is secured in place via a fastener, such as a set screw.

Generally, neither Brown, Burison, nor Rood discloses a reflector that is easily attached to and removed from the bicycle. The references all typically secure the reflector to the bicycle through use of fasteners, which may need tools and which may become loose over time and cause the reflector to come off. Moreover, Sloot does not adequately secure the reflector to the wheel because the reflector is free to slide up and down the spokes as the wheel turns. Additionally, neither of these references disclose a securing mechanism for attaching the reflector to the bicycle that is simple and inexpensive to use.

What is desired, therefore, is a reflector that is easy to install and remove. Another desire is a reflector having a securing mechanism that adequately secures the reflector to the bicycle. It is another desire to have a reflector with a securing mechanism that is less likely to loosen over time, thereby reducing the possibility of the reflector coming loose from the bicycle.

SUMMARY OF THE INVENTION

Accordingly, it is an object of the invention to provide a reflector that is easy to install and remove.

Another object of the invention is to provide a reflector having a securing mechanism that adequately secures the reflector to the bicycle.

A further object of the invention is to provide a reflector with a securing mechanism that is less likely to loosen over time.

These and other objects of the invention are achieved by providing a reflector. The reflector includes a flexible reflective element wrapped around a bicycle member. The reflector further includes a backing in contact with a first end of the flexible reflective element along a portion of a periphery of the backing, thereby defining a pocket. Lastly, the reflector includes a second end of the flexible reflective element placed in between the backing and the flexible reflective element by cooperation of the second end being held in place by the pocket.

The reflector may further include a securing mechanism connecting the first end with the second end for enhancing securement of the reflector. In certain embodiments, the securing mechanism is an adhesive. In other embodiments, the securing mechanism is a stud placed in an opening. In further embodiments, the securing mechanism is both a stud placed in an opening and an adhesive.

In another embodiment, the reflector includes a first flexible reflective element having a left end and a right end, and a second flexible reflective element having a left end and a right end. The left end of the first flexible reflective element further includes a left backing attached to the first flexible reflective element along a portion of a periphery of the left backing, thereby defining a left pocket. The right end of the first flexible reflective element further includes a right backing attached to the first flexible reflective element along a portion of a periphery of the right backing, thereby defining a second pocket. The left end of the second flexible reflective element is placed between the left backing and the first flexible reflective element by cooperation of the left end of the second flexible reflective element being held in place by the left pocket. Similarly, the right end of the second flexible reflective element is placed between the right backing and the right end of the first flexible reflective element by cooperation of the right end of the second flexible reflective element being held in place by the right pocket. An object is insertable between the first flexible reflective element and the second flexible reflective element and between the left backing and the right backing.

The invention and its particular features and advantages will become more apparent from the following detailed description considered with reference to the accompanying drawings.

BRIEF DESCRIPTION OF THE DRAWINGS

FIG. 3 depicts the backing attached to the reflector of FIG. 2, thereby defining a pocket.

FIG. 4 depicts the reflector of FIG. 2 being secured to a bicycle part.

FIG. 5 depicts a cross sectional view of FIG. 4.

FIGS. 6 and 7 depict another embodiment of the reflector of the invention having two reflective elements.

FIG. 8 depicts the embodiment of the reflector shown in FIGS. 6 and 7 secured to a bicycle part.

FIG. 9 depicts a cross sectional view of FIG. 8.

DETAILED DESCRIPTION OF THE DRAWINGS

Figure 1:
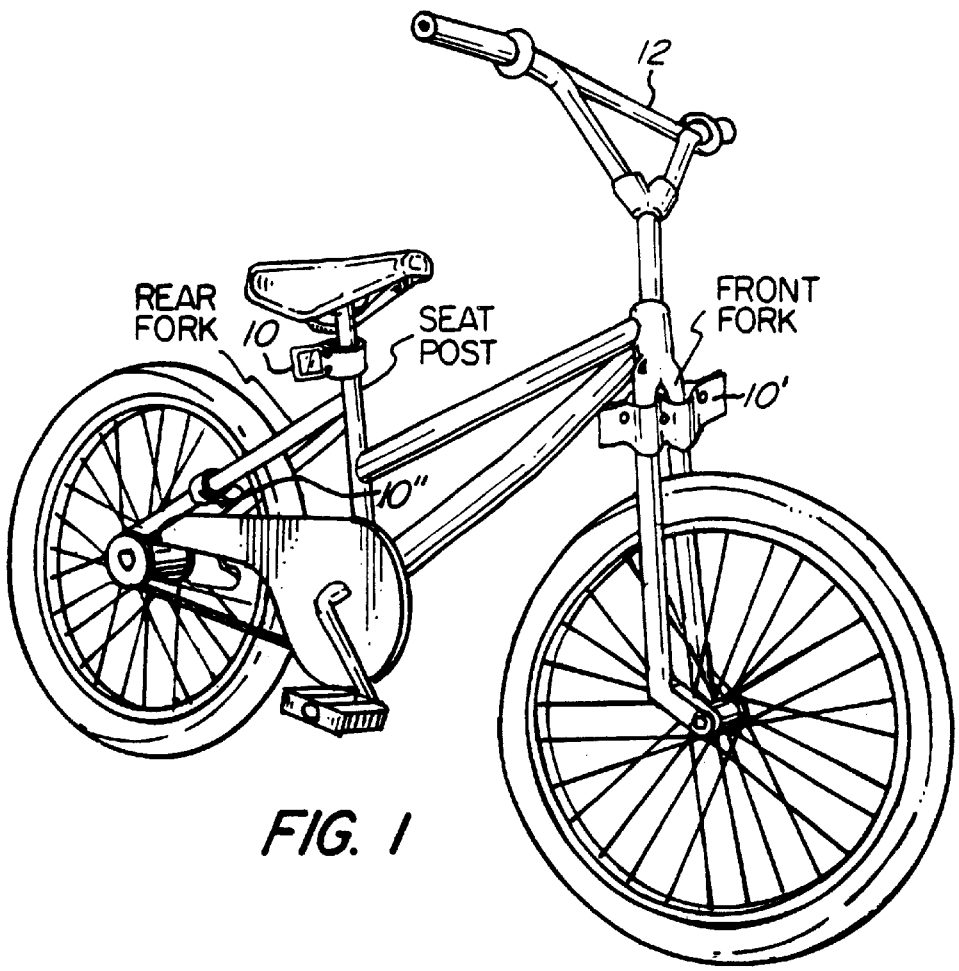
FIG. 1 depicts reflectors in accordance with the invention installed on a bicycle.
Figure 2:
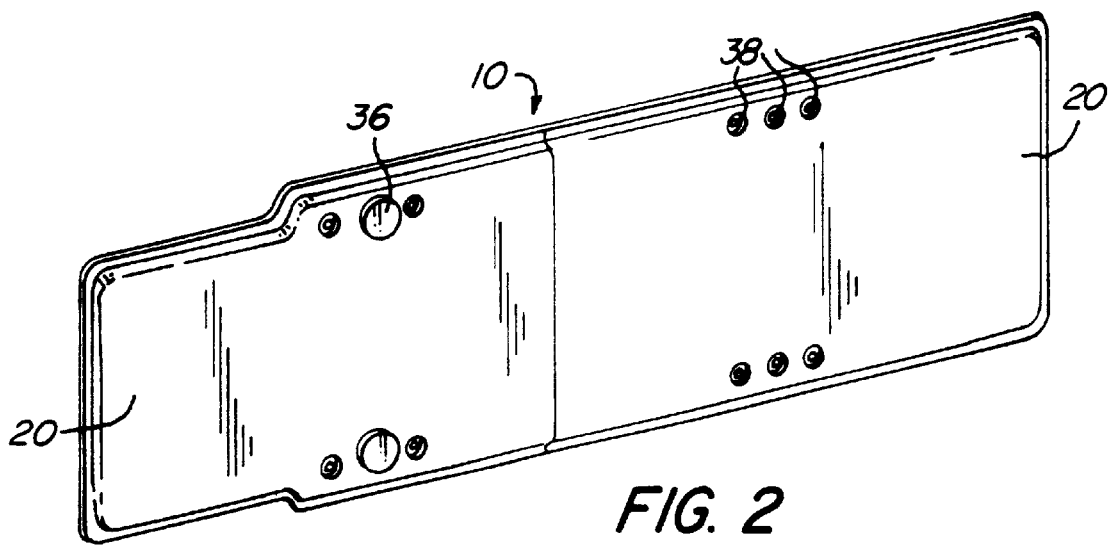
FIG. 2 depicts a reflector in accordance with a first embodiment of the invention.

FIG. 1 depicts various embodiments of the reflector 10 installed on bicycle 12. As shown, reflector 10 is attachable to various areas of bicycle 12. FIG. 2 depicts a close up of reflector 10 in accordance with a first embodiment of the invention. Reflector 10 is an attachable accessory for bicycle 12 to improve the bicycle's visibility to others traveling on the same route as bicycle 12. Referring to FIG. 1, reflector 10 is attached to bicycle 12 by being wrapped around a bicycle part, such as a seat post, a front fork, a rear fork, or any part of bicycle 12 around which reflector 10 may be wrapped.

Reflector 10 comprises a flexible reflective element 20 and backing 22 (see FIG. 3) in contact with first end 24 of element 20. Backing 22 is in contact with a first end 24 along a portion of a backing's periphery 26. Because the entire periphery 26 is not in contact with first end 24, there is an opening 28 (see FIGS. 3–5) in periphery 26 and, therefore, a pocket is defined between backing 22 and element 20. To attach reflector 10 to bicycle 12, element 20 is wrapped around a part 14 (see FIGS. 4–5) of bicycle 12 and a second end 34 of flexible reflective element 20 is placed between backing 22 and element 20. The pocket formed by backing 22 and first end 24 improves securement of second end 34 between backing 22 and first end 24.

Referring to FIG. 3, to further enhance securement of first end 24 within the pocket, a securing mechanism may be used to secure first end 24 with second end 34. Adhesive 30 may be applied to the back of element 20 such that, when being wrapped around part 14, adhesive 30 is in contact and positioned between element 20 and part 14.

Referring to FIGS. 2 and 4, another embodiment of the invention is shown where the securing mechanism is a stud 36 placed in opening 38. For exemplary purposes, stud 36 is placed on second end 34 and opening 38 is placed on first end 24. However, stud 36 may be placed on first end 24 and opening 38 may be placed on second end 34. Stud 36 further includes a mushroom-shaped, or arrow-shaped, head 40 for facilitating insertion of stud 36 into opening 38 but inhibits removal of stud 36 from opening 38. Moreover, a plurality of openings 38 and studs 36 may be used to adapt to variably sized parts 14 of bicycle to which reflector 10 is being attached. Additionally, stud 30 is not necessarily integrally formed with either first or second ends, 24 and 34, but may be a separable piece that is passed through two openings, one opening on first end 24 and one opening on second end 34.

In another embodiment, both adhesive 30 and the combination of stud 36 and opening 38 are used for enhancing securement of second end 34 between first end 24 and backing 22.

Flexible reflective element 20 may include different colors on the same element 20. For example, element 20 may be a reflector with reflective properties of several colors on one side such that, when wrapped around part 14, reflector 10 reflects different colors depending on the position of a viewer viewing reflector 10 (see reflector 10 attached to the seat fork of FIG. 1, where one color may face rearward and another color may face forward).

FIGS. 6–8 depicts another embodiment of the invention. Reflector 10' is shown to have two flexible reflective elements. First element 50 has a left backing 52 on the left side of first element 50 and a right backing 54 on the right side of first element 50. FIG.6 shows only first element 50 and FIG. 7 shows only second element 56. FIG. 8 shows both first and second elements, 50 and 56, attached to bicycle part 14. Similar to backing 22 mentioned above under the description for FIGS. 1–5, backings 52 and 54 are in contact with first element 50 along a portion of backings peripheries, thereby defining pockets. To secure reflector 10' to part 14, second element 56 has a left side 58 and a right side 60, each of which is placed in the pockets formed by backings 52 and 54, respectively.

To further secure reflector 10' to part 14, adhesive 30 may be applied between first and second elements, 50 and 56. Also, stud 36 and opening 38, instead of or in addition to adhesive 30, may be utilized to further enhance securement. Adhesive 30, stud 36, and opening 38 include all of the limitations as described above. FIG. 9 shows a cross sectional view of FIG. 8.

Figure 10:
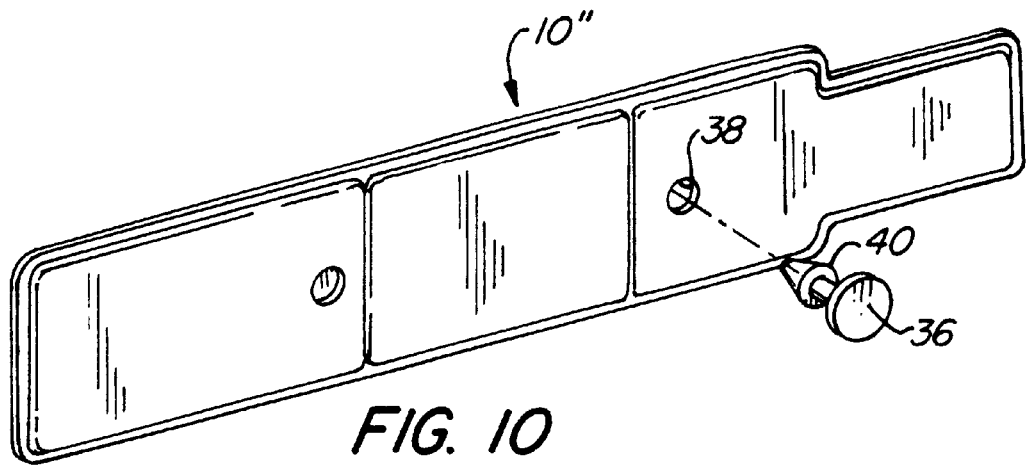
FIG. 10 depicts another embodiment of the reflector being made of a stiffer material.
Figure 11:
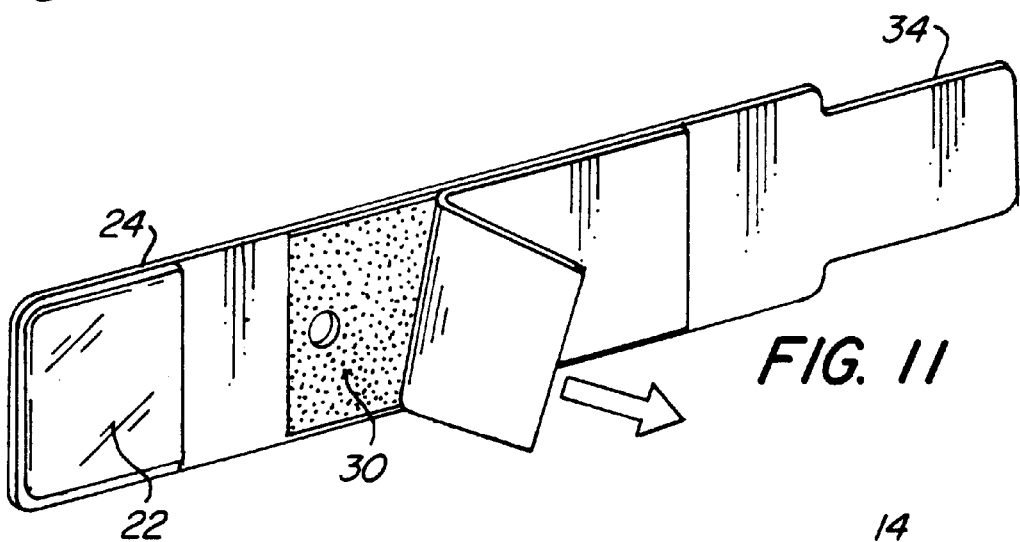
FIG. 11 depicts the embodiment of FIG. 10 having adhesive and a backing.
Figure 12:
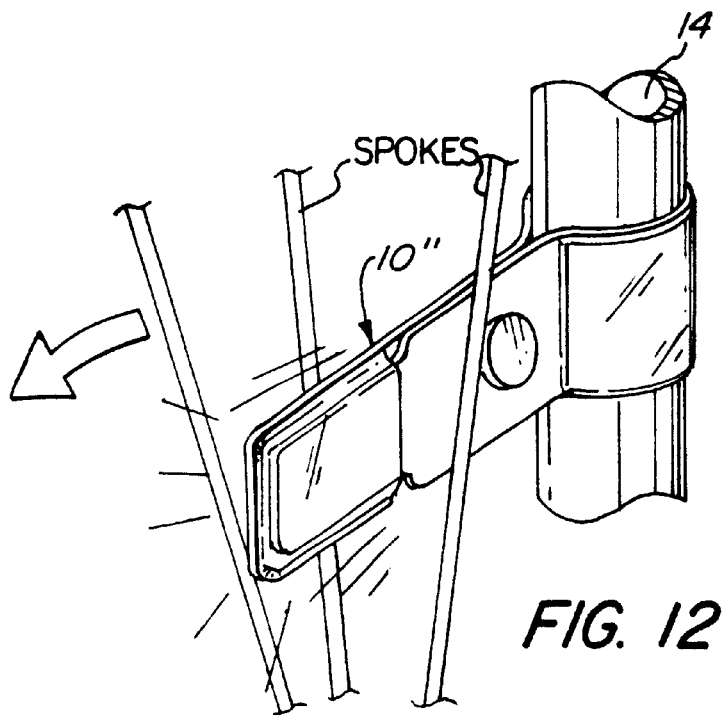
FIG. 12 depicts the embodiment of FIG. 10 secured to a bicycle part.

In another embodiment, and shown in FIGS. 10–12, reflector 10" is made of a stiffer, more rigid or semi rigid material, for application to a front or rear fork and for further having an first end 24 of reflector 10 interfere with spokes of a tire (see FIG. 12). This interference creates a desirable noise, for certain bicycle users, when the wheel is turned. Reflector 10" in this embodiment is configured as is reflector 10 described under FIGS. 1–5.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A reflector, comprising:
   a flexible reflective element having a first end and a second end;
   a backing attached to said first end of said flexible reflective element along a portion of a periphery of said backing, thereby defining a pocket; and
   wherein said second end of said flexible reflective element is wrapped around a bicycle member and placed in between said backing and said flexible reflective element by cooperation of said second end being held in place by the pocket.

2. The reflector according to claim 1, further comprising a securing mechanism connecting said first end with said second end for enhancing securement of the reflector.

3. The reflector according to claim 2, wherein said securing mechanism is an adhesive.

4. The reflector according to claim 2, wherein said securing mechanism is a stud placed in an opening.

5. The reflector according to claim 2, wherein said securing mechanism is a stud placed in an opening and an adhesive.

6. The reflector according to claim 1, wherein said flexible reflective element has various levels of rigidity.

7. A reflector, comprising:
   a first flexible reflective element having a left end and a right end;

a second flexible reflective element having a left end and a right end;

said left end of said first flexible reflective element further including a left backing attached to said first end of said first flexible reflective element along a portion of a periphery of said left backing, thereby defining a first pocket;

said right end of said first flexible reflective element further including a right backing attached to said right end of said first flexible reflective element along a portion of a periphery of said right backing, thereby defining a second pocket;

said left end of said second flexible reflective element being placed between said left backing and said first flexible reflective element by cooperation of said left end of said second flexible reflective element being held in place by the left pocket;

said right end of said second flexible reflective element being placed between said right backing and said right end of said first flexible reflective element by cooperation of said right end of said second flexible reflective element being held in place by the right pocket; and wherein an object is insertable between said first flexible reflective element and said second flexible reflective element and between said left backing and said right backing.

8. The reflector according to claim 7, further comprising at least one securing mechanism connecting said first flexible reflective element with said second flexible reflective element for enhancing securement of the reflector to the object.

* * * * *